Figure 5:
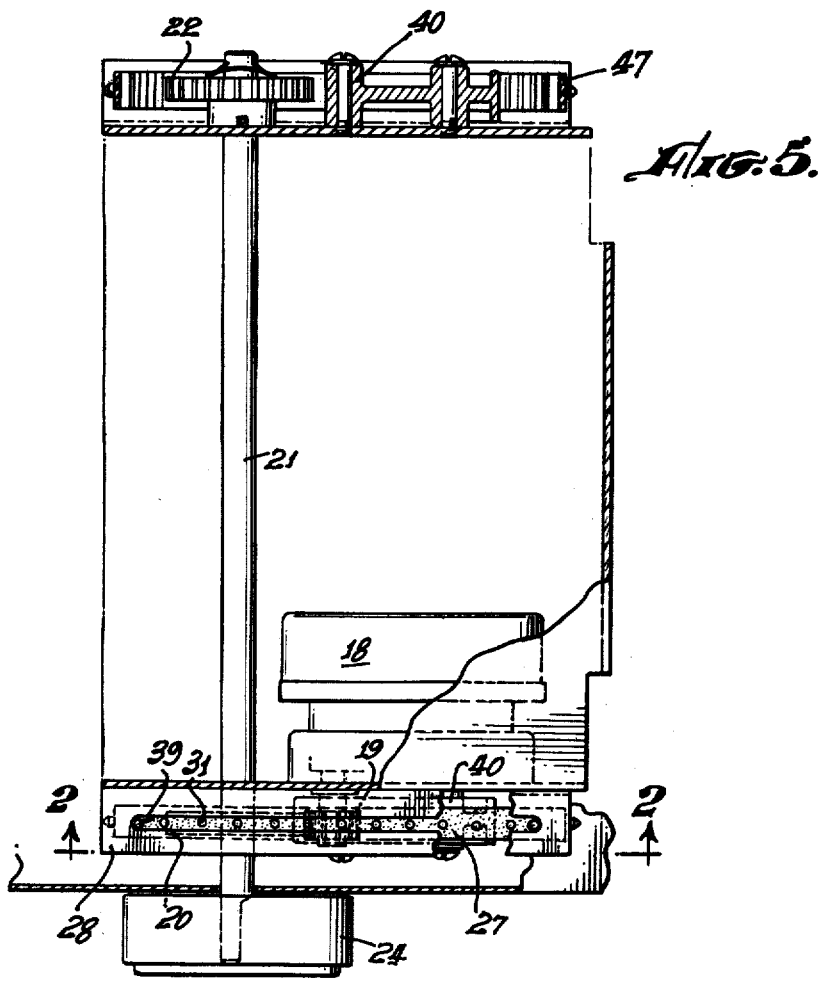

Dec. 10, 1963  W. E. PHILLIPS  3,113,823
DRIVE FOR RECORDER CHART PAPER
Filed May 17, 1960  2 Sheets-Sheet 1
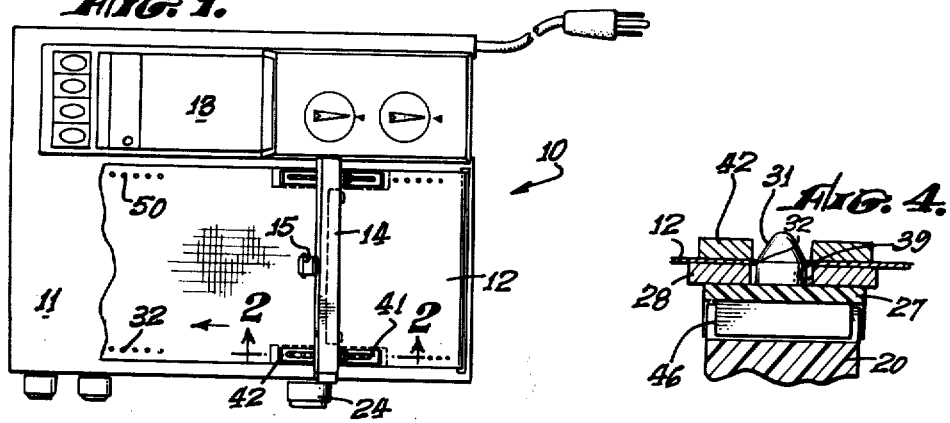
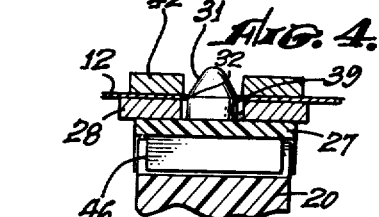
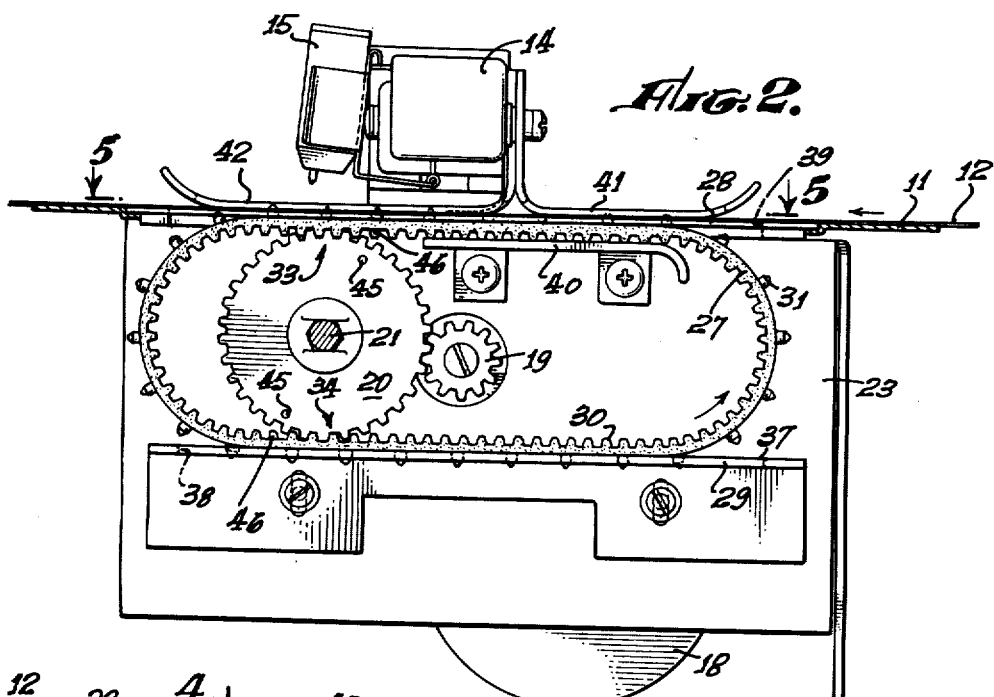
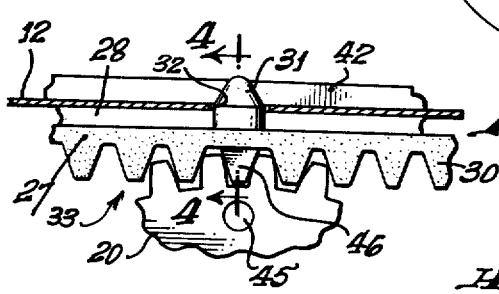
Wayne E. Phillips,
INVENTOR.
BY HIS ATTORNEYS
Harris, Kiech, Russell & Kern.

Dec. 10, 1963        W. E. PHILLIPS        3,113,823

DRIVE FOR RECORDER CHART PAPER

Filed May 17, 1960        2 Sheets-Sheet 2

WAYNE E. PHILLIPS,
INVENTOR.

BY HIS ATTORNEYS.

HARRIS, KIECH, RUSSELL & KERN.

United States Patent Office 3,113,823
Patented Dec. 10, 1963

3,113,823
DRIVE FOR RECORDER CHART PAPER
Wayne E. Phillips, Riverside, Calif., assignor to Beckman Instruments, Inc., a corporation of California
Filed May 17, 1960, Ser. No. 29,708
11 Claims. (Cl. 346—136)

This invention relates to drives suitable for advancing sheet material such as recorder chart paper along a recorder marking surface or the like and will be described herein as used in a pen and ink recorder.

In one type of drive, the chart paper passes around a cylindrical driving wheel maintaining engagement with the wheel for 90° to 180° of rotation. Such drive provides good contact between the driving wheel and the paper over an extended period and substantially eliminates slipping, damage to the paper, wrinkling and the like. However, there are many applications where it is necessary or desirable to have the paper move in a plane and to have the paper move over a flat surface in the chart marking zone with the driving force applied at the zone.

For such applications it has been the practice to route the paper in a straight path tangent to the cylindrical driving wheel so that only a very small portion of the driving wheel engages the paper at any time. This results in a high loading at the point of contact, distortion of the paper, tearing of the perforations, yawing and sometimes hesitant and erratic motion of the paper. Accordingly it is an object of the present invention to provide a new and improved drive for moving sheet material such as chart paper or the like along a flat or relatively flat support surface with the driving force applied at the support surface. A further object is to provide such an apparatus wherein the area of contact between the drive mechanism and the chart paper is extended a considerable distance along the line of travel of the paper.

It is an object of the invention to provide an apparatus for driving chart paper or the like along a support surface which apparatus includes a driving means, a drive wheel driven by the driving means, a flexible drive belt having means on its inner surface for engaging the wheel and means on its outer surface for engaging the chart paper, guide means for urging the belt into engagement with the wheel at two positions, and means for mounting the belt and guide means to position a portion of the outer surface of the belt at the support surface for engaging and driving the chart paper. A further object is to provide such structure wherein the drive wheel is a conventional spur gear and the flexible drive belt has a series of gear teeth on its inner surface for engaging the spur gear. Another object is to provide such structure wherein the belt carries a series of outwardly projecting teeth or nibs for engaging a corresponding row of perforations in the chart paper.

It is an object of the invention to provide an apparatus for driving chart paper or the like along a support surface which apparatus includes two spaced flexible drive belts with their outer surfaces positioned at the support surface for engaging and driving the chart paper. A further object is to provide such structure wherein the two drive belts move along paths parallel to the direction of motion of the paper. A further object is to provide such structure wherein one of the drive belts moves along a path parallel to the direction of motion of the paper while the second belt moves along a path oblique to the direction of motion of the paper to apply a lateral stretching force to the paper in conjunction with the longitudinal driving force.

It is an object of the invention to provide a drive including a belt with inwardly and outwardly projecting teeth, a guide plate having an elongated slot, an upper surface for positioning in the plane of the chart paper and a lower surface for engaging the outer surface of the belt, with the outer teeth of the belt projecting through the slot, a guide shoe spaced from the lower surface of the guide plate providing a belt space therebetween, and drive means for engaging the inner teeth of the belt to continuously drive the belt through the belt space and move the paper along the guide plate.

The invention also comprises novel details of construction and novel combinations and arrangements of parts, which will more fully appear in the course of the following description. The drawings merely show and the description merely describes preferred embodiments of the present invention which are given by way of illustration or example.

Figure 6:
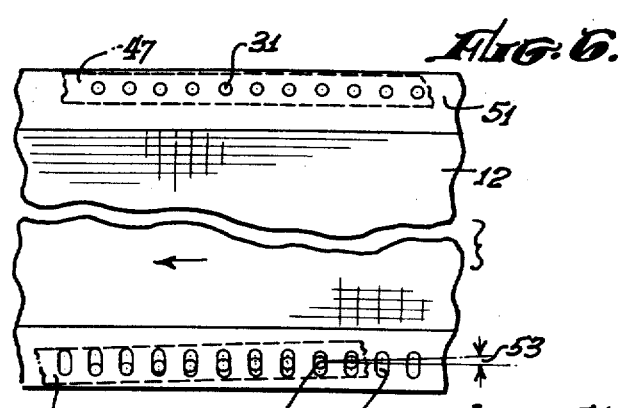

In the drawings:
FIG. 1 is a plan view of a recorder incorporating the drive of the invention;
FIG. 2 is an enlarged partial sectional view taken along the line 2—2 of FIG. 1;
FIG. 3 is an enlarged fragmentary view of the drive of FIG. 2;
FIG. 4 is a sectional view taken along the line 4—4 of FIG. 3;
FIG. 5 is a sectional view taken along the line 5—5 of FIG. 2; and
FIG. 6 illustrates an alternative form of the drive.

The recorder 10 of FIG. 1 has a flat recording surface 11 which supports a strip of chart paper 12. A control section 13 is positioned to one side of the recording surface and a guide 14 supports a marking pen 15 above the recording surface. Suitable means for reciprocating the pen 15 in the guide 14 are provided in the control section 13 to produce a record of an incoming signal.

The drive includes a motor 18 having an output pinion which engages a spur gear 20 mounted on a shaft 21. Another spur gear 22 identical to the gear 20 is mounted on the shaft 21 on the opposite side of the housing 23 and a knob 24 is fixed to a projecting end of the shaft to provide for manual rotation of the shaft.

A flexible drive belt 27, which may be molded of nylon or similar material, is positioned about the gear 20 between an upper guide plate 28 and a lower guide plate 29. The drive belt carries means for engaging the drive wheel or gear 20 in the form of a series of gear teeth 30 on the inner surface of the belt. The drive belt also includes means for engaging the chart paper 12 in the form of a series of teeth or nibs 31 projecting from the outer surface of the belt to engage corresponding perforations 32 in the chart paper. The guide plates 28, 29 are spaced slightly from the gear 20 to provide space for the flexible belt therebetween with the guide plates holding the belt in engagement with the gear at an upper position 33 and a lower position 34, thereby defining the position of the belt relative to the drive gear.

The lower guide plate 29 may have a flat upper surface 37 with a slot 38 therein to provide clearance for the outer teeth 31 of the belt. Similarly, the upper guide plate 28 may have a flat lower surface for engaging the belt and a flat upper surface for positioning flush with the recording surface 11. A slot 39 is provided in the upper guide plate permitting the teeth 31 to project above the recording surface for engaging the chart paper.

A guide shoe 40 may be mounted on the housing 23 inside the loop of the belt 27 and spaced from the upper guide plate 28 to provide a guide space therebetween for the belt to exactly position the belt relative to the guide plate. Paper-holddown fingers 41, 42 may be carried on the guide 14 to hold the chart paper down against the recording surface.

Indicia are provided on the gear 20 and belt 27 to facilitate assembly of the drive. Diametrically opposed marks 45 are made in the gear 20. Two of the teeth 30, indicated at 46, are made narrower than the other teeth on the belt. When the drive is assembled, one of the narrow teeth 46 is positioned in the slot indicated by one mark 45 and the other narrow tooth is positioned in the slot indicated by the other mark, thereby providing a quick and easy assembly guide. It should be noted that the drive wheel 20 and the belt 27 do not have to have the particular relative positions shown in FIG. 2, it merely being necessary that the drive wheel engage the drive belt at at least two positions so as to maintain their relative positions fixed.

Another flexible belt 47 may be positioned for engagement with the drive gear 22 in the same manner as the belt 27 and the gear 20 when two drives are desired. The details of the mechanism associated with the belt 47 are the same as those of the belt 27 and will not be described again.

Ordinarily, the two belts 27, 47 are positioned to move along tracks parallel to each other and parallel to the motion of the chart paper, as seen in FIGS. 1 and 5. Typically, a strip of chart paper will have two parallel rows 32, 50 of circular perforations for engagement by the teeth of the two drive belts (FIG. 1). Then when the paper has been accurately perforated and has not shrunk or stretched subsequent to perforation, the rows of perforations will be exactly aligned with the drive belts. However, ofttimes there is misalignment between the rows of perforations and the drive belts, resulting in tearing of the paper and erratic forward motion thereof. This problem may be overcome by perforating the chart paper as shown in FIG. 6 with one row 51 of circular perforations and another row 52 with perforations in the form of lateral slots. The slots then provide clearance for misalignment of the two rows of perforations and dimensional changes of the paper following perforating. However, the slots permit lateral play of the paper resulting in undesirable wrinkling at the marking surface as well as misalignment and yawing. One embodiment of the drive of the present invention provides for the use of slotted paper while maintaining the paper taut and flat in the marking zone. Referring to FIG. 6, the drive belt associated with the circular perforations, here the belt 47, is moved along a track parallel to the row of perforations and the direction of motion of the chart paper. The other belt associated with the laterally slotted perforations, here the belt 27, is moved along a track that is skewed or positioned at a small oblique angle 53 to the direction of motion of the paper.

As the paper is driven to the left, as shown in FIG. 6, the teeth 31 of the skewed belt 27 first engage the perforations 52 in the upper area of the slot, as seen in FIG. 6. As the belt and paper progress, the teeth move laterally toward the edge of the paper and engage the edge of the slot to apply a lateral force and make the paper taut. This drive arrangement provides both the longitudinal force for advancing the paper along the support surface and a lateral force for maintaining the paper flat and wrinkle free. The drive mechanism of FIG. 5 can be utilized by incorporating an offset universal coupling in the shaft 21, or by cutting the teeth of one driving gear at an angle to the plane of the gear with such angle equal to the angle between the lines of motion of the paper and belt, or by taking advantage of the lateral flexibility of the belt with the gears 20, 22 parallel and one set of guide plates 28, 29 skewed relative to the other set.

Although exemplary embodiments of the invention have been disclosed and discussed, it will be understood that other applications of the invention are possible and that the embodiments disclosed may be subjected to various changes, modifications and substitutions without necessarily departing from the spirit of the invention.

I claim as my invention:

1. In an apparatus for driving sheet material along a support surface, the combination of: a driving means; a drive wheel driven by said driving means; a flexible drive belt, said belt having means on its inner surface for engaging said wheel in driving relation and having means on its outer surface for engaging the sheet material in driving relation; guide means for maintaining said belt in engagement with said wheel at substantially diametrically opposed positions; said belt traveling in a path having first and second looped portions separated by the points of contact of said belt with said drive wheel, each of said looped portions being otherwise unrestrained so as to leave said belt substantially free of longitudinal stress; and means for mounting said belt and guide means to position a portion of said outer surface of said belt at the support surface for engaging and driving the sheet material.

2. In an apparatus for driving perforated chart paper or the like along a support surface, the combination of: a driving means; a drive wheel driven by said driving means; a flexible drive belt, said belt having a series of teeth projecting from its inner surface for engaging said wheel in driving relation and having a series of teeth projecting from its outer surface for engaging the chart paper in driving relation; guide means for maintaining said belt in engagement with said wheel at substantially diametrically opposed positions so as to form a looped portion extending beyond said drive wheel on either side thereof, each of said looped portions being otherwise unrestrained so as to leave said belt substantially free of longitudinal stress; and means for mounting said belt and guide means to position a portion of said outer surface of said belt at the support surface for engaging the perforations of the chart paper and driving same.

3. In an apparatus for driving chart paper or the like along a support surface, the combination of: a drive motor; a drive wheel driven by said drive motor; a flexible drive belt, said belt having means on its inner surface for engaging said wheel in driving relation and a series of teeth projecting from its outer surface for engaging the chart paper in driving relation; a first guide for maintaining said belt in engagement with said wheel at a first position; a second guide for maintaining said belt in engagement with said wheel at a second position, said second guide having a slot with said teeth projecting therethrough; said first and second positions being substantially diametrically opposed such that said belt forms two looped portions, said looped portions being otherwise unrestrained so as to leave said belt substantially free of longitudinal stress and means for mounting said belt and guides with said slot at the support surface with said second guide forming a portion of the support surface, to project said teeth therethrough into engagement with the chart paper.

4. In an apparatus for driving chart paper or the like along a support surface, the paper having parallel rows of perforations, the combination of: a drive motor; first and second spaced drive wheels driven by said motor; first and second flexible drive belts, each belt having means on its inner surface for engaging a drive wheel in driving relation and having a series of teeth projecting from its outer surface for engaging the chart paper in driving relation; first guide means for maintaining said first belt in engagement with said first wheel at substantially diametrically opposed positions so as to form two looped portions; second guide means for maintaining said second belt in engagement with said second wheel at substantially diametrically opposed positions; each of said looped portions of said first and second belts being otherwise unrestrained so as to leave said belts substantially free of longitudinal stress; and means for mounting said belts and guide means to position a corresponding portion of the outer surface of each belt at the support surface for engaging respective rows of perforations of the chart paper.

5. In an apparatus for driving chart paper or the like along a support surface, the combination of: a drive motor; first and second spaced drive wheels driven by said motor; first and second flexible drive belts, each having means on its inner surface for engaging a drive wheel in driving relation and having means on its outer surface for engaging the chart paper in driving relation; first guide means for maintaining said first belt in engagement with said first wheel at substantially diametrically opposed positions so as to form a looped portion extending beyond said drive wheel on either side thereof; second guide means for maintaining said second belt in engagement with said second wheel at substantially dimetrically opposed positions so as to form a looped portion extending beyond said drive wheel on either side thereof; each of said looped portions of said first and second belts being otherwise unrestrained so as to leave said belts susbtantially free of longitudinal stress and means for mounting said belts and guide means to position a corresponding portion of the outer surface of each belt at the support surface for engaging and driving the chart paper, with said first belt moving along a path parallel to the driection of movement of the paper including means for engaging the chart paper to limit lateral movement of the paper, and with said second belt moving along a path oblique to the direction of movement of the paper.

6. In an apparatus for driving chart paper or the like along a support surface, the paper having parallel rows of perforations with the perforations of at least one of the rows comprising slots having the longitudinal axes thereof disposed laterally of the paper, the combination of: a drive motor; first and second spaced drive wheels driven by said motor; first and second flexible drive belts, each having means on its inner surface for engaging a drive wheel in driving relation and having a series of teeth projecting from its outer surface for engaging the chart paper in driving relation; first guide means for maintaining said first belt in engagement with said first wheel at two positions, with said guide means having a slot with the teeth of said first belt projecting therethrough; second guide means for maintaining said second belt in engagement with said second wheel at two positions, said guide means having a slot with the teeth of said second belt projecting therethrough; and means for mounting said belts and guide means with said slots at the support surface to project the teeth of the belts therethrough into engagement with the chart paper, with said first belt moving along a path parallel to the direction of movement of the paper applying a longitudinal force to the paper, and with said second belt moving along a path oblique to the direction of movement of the paper applying longitudinal and lateral forces to the paper.

7. In an apparatus for driving perforated chart paper or the like along a flat support surface, the combination of: a drive gear; a flexible belt having a series of teeth projecting from its outer surface for engaging the chart paper and a series of teeth projecting from its inner surface for engaging said drive gear; a first guide plate mounted adjacent said drive gear for positioning flush with the support surface, said first guide plate having a slot therein; and a second guide plate mounted substantially parallel to said first guide plate on the opposite side of and adjacent said drive gear, with said belt positioned in driving engagement with said gear between said guide plates, with the outer teeth of said belt projecting through said slot for driving engagement with the chart paper; said belt engaging said drive gear at substantially diametrically opposed points and extending beyond said points to form a looped portion on either side of said drive gear, each of said looped portions being otherwise unrestrained so that said belt is substantially free of longitudinal stress.

8. In an apparatus for driving perforated chart paper or the like along a flat support surface, the combination of: a drive gear; a flexible belt having a series of teeth projecting from its outer surface for engaging the chart paper and a series of teeth projecting from its inner surface for engaging said drive gear; a first guide plate mounted with its inner surface adjacent said drive gear for positioning with its outer surface in the plane of the paper, said first guide plate having an elongated slot therein; a second guide plate mounted adjacent said drive gear with its inner surface facing said inner surface of said first guide plate, with said belt positioned between said plates with straight sections thereof engaging said gear and with the outer teeth projecting through said slot for engaging the paper; said belt engaging said drive gear at substantially diametrically opposed points and extending beyond so as to form a looped portion on either side thereof, each of said looped portions being otherwise unrestrained so that said belt is substantially free of longitudinal stress; and a guide shoe mounted within the loop of said belt adjacent said first guide plate, with said shoe engaging the inner surface of said belt and, in conjunction with said gear, maintaining said outer teeth in said slot.

9. In an apparatus for driving chart paper or the like along a support surface, the combination of: a belt having a series of teeth projecting from its inner surface and a series of teeth projecting from its outer surface; a guide plate having an elongated slot, an upper surface for positioning in the plane of the chart paper and a lower surface for engaging the outer surface of said belt with said outer teeth projecting through said slot; a guide shoe spaced from the lower surface of said guide plate providing a belt space therebetween; and drive means for engaging said inner teeth to continuously drive said belt through the belt space and move the paper along the support surface; said belt engaging said drive means at substantially diametrically opposed points so as to form a looped portion on either side of said drive means, each of said looped portions being otherwise unrestrained so that said belt is substantially free of longitudinal stress.

10. In a drive for a recorder having a marking member, a flat marking surface, and means for moving the marking member along a marking zone of the marking surface, the combination of: a drive wheel; a flexible drive belt having a series of teeth projecting from its inner surface for engaging said wheel in driving relation and a series of teeth projecting from its outer surface for engaging a chart member in driving relation; a guide plate having flat upper and lower surfaces; and means for mounting said belt and guide plate with said upper surface at the marking zone and with said lower surface adjacent said wheel providing a space for said belt to pass over said wheel and under said plate with said outer teeth projecting above said plate; said belt engaging said drive wheel at substantially diametrically opposed points so as to form a looped portion on either side thereof, each of said looped portions being otherwise unrestrained so that said belt is substantially free of longitudinal stress.

11. In an apparatus for driving chart paper or the like along a support surface, the combination of: a drive motor; a drive gear driven by said drive motor; a continous unitary belt of flexible material, said belt having gear teeth formed on its inner surface for engaging said drive gear and having a series of teeth projecting from its outer surface for engaging the chart paper; a first guide member for maintaining said belt in engagement with said gear at a first position; and a second guide member comprising a portion of the support surface for maintaining said belt in engagement with said gear at a second position, said second guide member having a slot with said teeth projecting therethrough into engagement with the chart paper; said first and second positions being substantially diametrically opposed such that said belt forms a looped portion on either side of said gear, each of said looped portions being otherwise unrestrained so as to leave said belt substantially free of longitudinal stress.

References Cited in the file of this patent

UNITED STATES PATENTS

| | | |
|---|---|---|
| 339,092 | Frieseke | Mar. 30, 1886 |
| 2,140,028 | Nichols | Dec. 13, 1938 |
| 2,258,799 | Payne | Oct. 14, 1941 |
| 2,432,229 | Dern et al. | Dec. 9, 1947 |
| 2,434,111 | Hawley et al. | Jan. 6, 1948 |
| 2,633,354 | Mixer | Mar. 31, 1953 |
| 2,931,964 | Dawe et al. | Apr. 5, 1960 |

FOREIGN PATENTS

| | | |
|---|---|---|
| 53,840 | Netherlands | Feb. 15, 1943 |

UNITED STATES PATENT OFFICE
CERTIFICATE OF CORRECTION

Patent No. 3,113,823 December 10, 1963

Wayne E. Phillips

It is hereby certified that error appears in the above numbered patent requiring correction and that the said Letters Patent should read as corrected below.

Column 2, lines 37 and 38, after "pinion" insert -- 19 --; column 5, line 17, for "dimetrically" read -- diametrically --; line 27, for "driection" read -- direction --.

Signed and sealed this 30th day of June 1964.

(SEAL)
Attest:

ERNEST W. SWIDER
Attesting Officer

EDWARD J. BRENNER
Commissioner of Patents